March 17, 1936. J. N. KARALIS 2,034,238
PIE RACK
Filed Dec. 29, 1934

INVENTOR
John N. Karalis
BY H.S. Johnson
ATTORNEY

Patented Mar. 17, 1936

2,034,238

UNITED STATES PATENT OFFICE 2,034,238

PIE RACK

John N. Karalis, Minneapolis, Minn.

Application December 29, 1934, Serial No. 759,711

1 Claim. (Cl. 107—67)

My invention relates to improvements in means for inserting and removing pies from the oven. Small individual pies are now being extensively used and are baked in large quantities and great difficulty is experienced in handling these small individual pies in the oven for the reason that the pies are too light to permit the use of an ordinary baker's peel to remove the pies from the oven.

Figure 1:
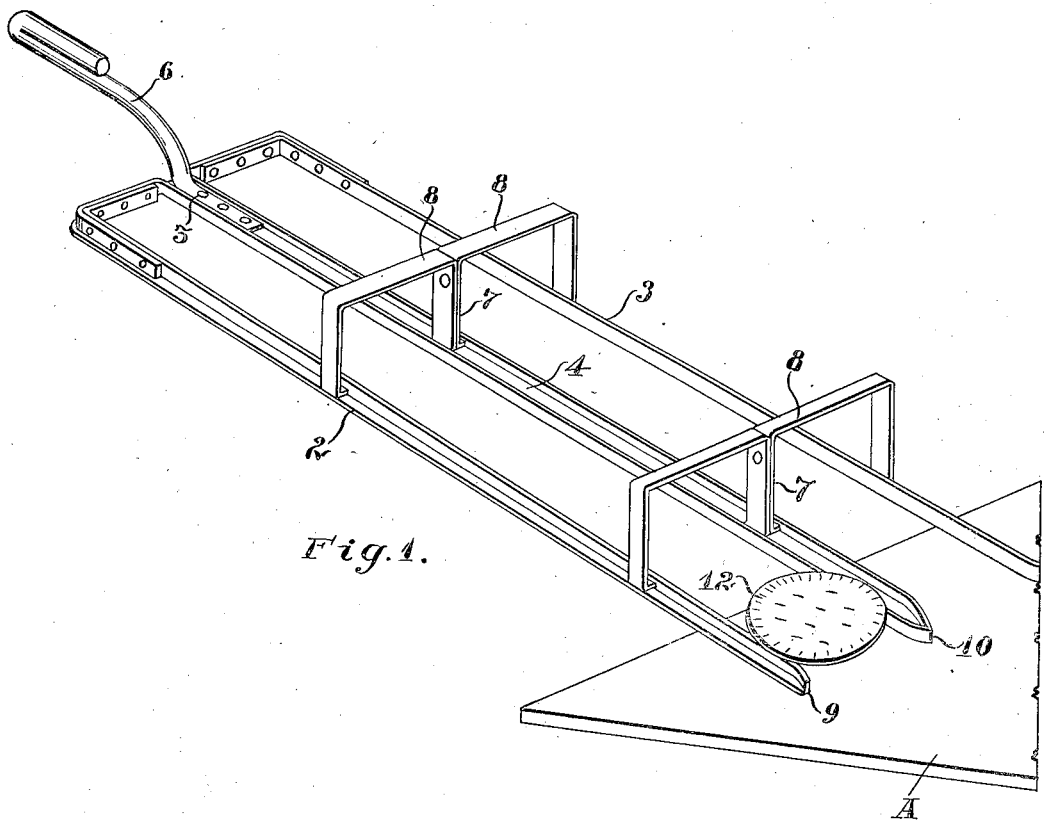
Figure 2:
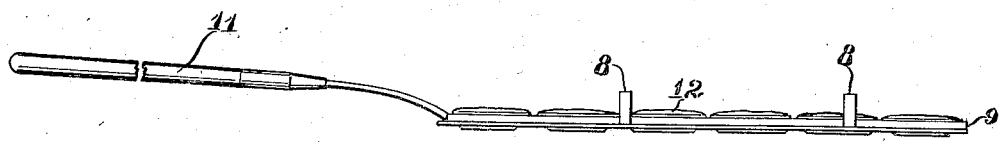

The objects and advantages of the present invention will be more fully set forth in the following description and the accompanying drawing, wherein:

Figure 1 is a view in perspective of my invention, shown in position placing pies in an oven; and Figure 2 is a side view of my device shown with a somewhat longer handle than the form shown in Figure 1, to better adapt it for removing the pies.

Referring to the drawing in detail, A represents a portion of an oven. My invention consists of a form of rack, preferably made of angle iron. In the form shown adapted for the removal of two rows of pies, two sections of angle iron 2 and 3 are employed, each section being bent to form spaced side bars with the intermediate space in proportion to the width of the pie tins. The outwardly projecting flanges 4 of the sections contact, as shown in Figure 1, forming a support at the outer end for the securing rivets 5 of the handle 6 and intermediate of the handle and open end of the rack forming a support for the posts 7 of the braces 8. The outer posts of the braces are supported on the outwardly projecting flanges of the bars 2 and 3.

The inner spaced ends 9 of the outer bars are outwardly flared and the adjacent joined ends 10 of the inner bars are brought to a meeting point so as to constitute flared openings between the bars of the rack to easily receive the pie tins, as illustrated in Figure 1.

The braces 8, as well as strengthening and holding the rack bars connected also constitute handles co-operating with the handle 6 in the utilization of the device.

I preferably use a rack with a short handle for placing the pies within the oven, and a similar rack with a longer handle 11 for removing the pies from the oven.

In operation, the pie tins are placed upon the rack in the space between the bars with the sides of the tins resting upon the sides of the bars, and, as will be evident, a material number of pie tins may be accommodated by completely filling the rack.

In placing the pies in the oven the rack filled with the pies may be slid into the oven and then the rack tilted, as illustrated in Figure 1, to allow the pies to slide off into aligning position in the oven.

In removing them, the rack is put into the oven and tilted so that the flared and tapered ends can be inserted under the rim of the pie tin 12 permitting the rack being shoved under the rows of pies and then lifted out.

I claim:

An apparatus for inserting and removing pie tins from an oven consisting of two sections made of angle iron, each of these sections being bent to form an inner closed and an outer open end, the flat members of the angle irons on the inner sides of the sections forming a channel between the sections, an outwardly projecting handle secured in said channel at the closed end of said sections and forming a connection for said sections, a second upwardly projecting handle secured to the flat members of said angle irons, the free ends of the outer angle irons at the open end of the device being outwardly flared and the central angle irons being brought together, for the purpose set forth.

JOHN N. KARALIS.